United States Patent [19]

Takahara et al.

[11] Patent Number: 4,624,530

[45] Date of Patent: Nov. 25, 1986

[54] EDGE DOMAIN-FREE LIQUID CRYSTAL DISPLAY OF DOT MATRIX TYPE

[75] Inventors: Shoichiro Takahara; Masayuki Kikuno, both of Soraku, Japan

[73] Assignee: Sharp Kabushiki Kaisha, Osaka, Japan

[21] Appl. No.: 594,302

[22] Filed: Mar. 28, 1984

[30] Foreign Application Priority Data

Apr. 30, 1983 [JP] Japan .................................. 58-77811

[51] Int. Cl.⁴ ................................................ G02F 1/13
[52] U.S. Cl. ...................................... 350/336; 350/333
[58] Field of Search .................................. 350/33, 336

[56] References Cited

U.S. PATENT DOCUMENTS

| 4,105,297 | 8/1978 | Shimizu ............................... 350/336 |
| 4,140,371 | 2/1979 | Kanazaki et al. .................... 350/336 |
| 4,392,717 | 7/1983 | Shibuya et al. ................. 350/336 X |

FOREIGN PATENT DOCUMENTS 55-74517 6/1980 Japan ................................... 350/336

OTHER PUBLICATIONS

Stephany, J. F., "Improved Liquid Crystal Display Electrodes," *Xerox Disclosure J.*, vol. 5, No. 2, pp. 197–198 (Mar.-Apr. 1980).

Stephany, J. F., "Cosmetic Electrode Modification for LCD," *Xerox Disclosure J.*, vol. 3, No. 4, pp. 251–252 (Jul.-Aug. 1978).

*Primary Examiner*—John K. Corbin
*Assistant Examiner*—Richard F. Gallivan
*Attorney, Agent, or Firm*—Birch, Stewart, Kolasch & Birch

[57] ABSTRACT

A field effect mode liquid crystal display element displaying dot matrix pattern includes a cut-out portion formed either in the upper or lower electrode so that liquid crystal display molecules can be prevented from being inversely oriented at the edge of such a portion where these electrodes cross each other as might otherwise occur. The cutout portion prevents the liquid crystal display molecules from being inversely oriented at the edge of such a portion where these electrodes cross each other, thus significantly improving display quality. In addition, since such a cutout portion is provided by merely cutting off part of an electrode to prevent the unwanted inversion of LCD molecules during orientation, no specific signal process is required.

15 Claims, 17 Drawing Figures

EDGE DOMAIN-FREE LIQUID CRYSTAL DISPLAY OF DOT MATRIX TYPE

BACKGROUND OF THE INVENTION

The present invention relates to a field effect mode liquid crystal display (hereinafter called LCD) element incorprating a new electrode configuration, which effectively prevents the LCD elements from incorrectly displaying due to effect of a phenomenon called the "edge domain" phenomenon This phenomenon is generated in the dot pattern edge portion of the field effect LCD display elements used for a dot matrix display.

Conventionally, such a field effect mode LCD display element used for the dot matrix display contains electrodes having such a typical configuration shown in FIG. 1. FIG. 1-(a) shows a typical structure of such an electrode and FIG. 1-(b) a sectional view, respectively. Reference 1 is the lower glass substrate. Reference 2 is the upper glass substrate. Reference 3 is the common electrode formed on said lower glass substrate. Reference 4 is the segment electrode formed on said upper glass substrate and 5 indicates an LCD material. A dot display pattern is formed at the position where said common electrode 3 and segment electrode 4 cross each other, and is shown by means of hatching in FIG. 1(a). FIG. 2 shows the state of the arrayed LCD molecules when no field effect is applied (see FIG. 2-(a)) and when said field effect being applied (see FIG. 2-(b)), respectively. As shown in FIG. 2, LCD molecules are arrayed in a specific direction when no field effect is applied. Conversely, when the field effect is applied, LCD molecules that are present in the field-effect-applied position rotate to alter an optical characteristic of the display. Now, if only all the LCD molecules rise in a specific direction, a desired pattern comprising the correctly formed dots can be displayed. However, such an ideal pattern comprising the correctly formed dots is rarely displayed, and actually, a rectangular pattern is displayed without containing the display effect at the edge portion.

The cause of this symptom is described below. FIG. 3-(a) shows the relationship between the electrode position and the direction of the LCD molecules oriented to the glass substrate. When the segment electrode 4 formed on the upper glass substrate crosses the common electrode 3 formed on the lower glass substrate in a right angle, assuming that the orientation vector (a) against the upper glass substrate and the other orientation vector (b) against the lower glass substrate are respectively denoted by $\theta 1 = 45°$ and $\theta 2 = 45°$, the normal visual angle area can be provided in the direction of "6 o'clock". When this condition exists, the state of the LCD molecule array without the field effect indicates an orientation characteristics to the left, as shown in FIG. 3-(c). When using such a field effect mode LCD display element that contains the electrode configuration and means for processing orientation described above, it will display such a rectangular pattern 6 whose display content is partly absent from the edge portion 6a, as shown in FIG. 3-(c). However, when observing the display-lacking portion 6a in said edge from the upright 12 o'clock position, said portion 6a is visibly illuminated, causing a spotted pattern to be displayed. It is probable that such a phenomenon will take place only because, when electric signals are sent to both the common electrode 3 and segment electrode 4, the direction of the electric force line in said edge portion 6a may be disturbed, thus adversely affecting the direction of the rising LCD molecules, eventually causing them to be inversely oriented. In other words, LCD molecules are split into two parts; one is the portion 6b in which the LCD molecules normally turn, and the other is the portion 6a in which LCD molecules abnormally turn.

OBJECT AND SUMMARY OF THE INVENTION

The present invention aims at eliminating even the slightest distortion from the display pattern caused by the inverted orientation of the LCD molecules when receiving a field effect. More particularly, the present invention aims at preventing the LCD display from being affected by such a phenomenon derived from the inverted orientation so that the field effect mode LCD display element can stably develop a quality display.

Briefly speaking, in order to achieve the objects described above, a preferred embodiment of the present invention provides a cutout portion in either the upper or lower electrode in such an area where both electrodes cross each other so that unwanted inversion of the LCD molecules from normal orientation can be prevented effectively.

A preferred embodiment of the present invention provides a field effect mode LCD display element incorporating LCD molecules that are sealed between the upper and lower electrodes formed on the surfaces of the upper and lower substrates, in which, the upper and lower electrodes are provided with configurations being different from each other so that any desired pattern can be displayed at the position at which both electrodes cross, while a cutout portion is provided in either the upper or lower electrode for effectively preventing LCD molecules from inversely being oriented at the edge portion where both electrodes cross. Such a preferred embodiment of the present invention effectively prevents even the slightest inversion of the LCD molecules from normal orientation, thus achieving the significantly improved display quality. Since the present invention effectively prevents the LCD molecules from even the slightest inversion from normal orientation by merely providing a cutout portion in part of either the upper or lower electrode without requiring any means for processing electrical signals, this improvement may be practiced without an increase in display cost.

BRIEF DESCRIPTION OF THE DRAWINGS

FIG. 3-(b) illustrates a state of LCD molecules being arrayed; and FIG. 3-(c) illustrates a display pattern;

FIG. 4-(b) is a display pattern related to FIG. 4-(a)

DETAILED DESCRIPTION OF THE INVENTION

In reference to the attached drawings, a preferred embodiment of the field effect mode LCD display element achieved by the present invention is described below.

Figure 1A:
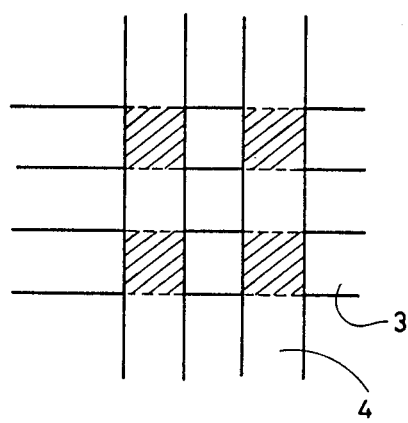
FIG. 1 is a conventional field effect mode LCD display element used for dot matrix display, in which, FIG. 1-(a) illustrates a simplified view denoting the electrode configuration and FIG. 1-(b) illustrates a sectional view.
Figure 1B:
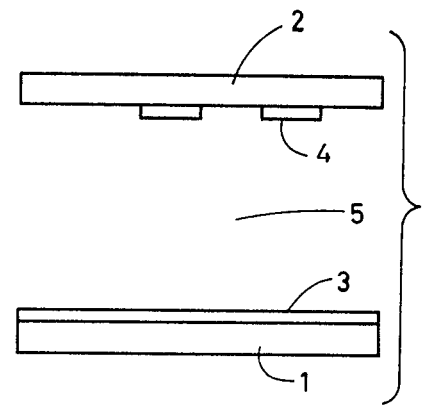
Figure 2A:
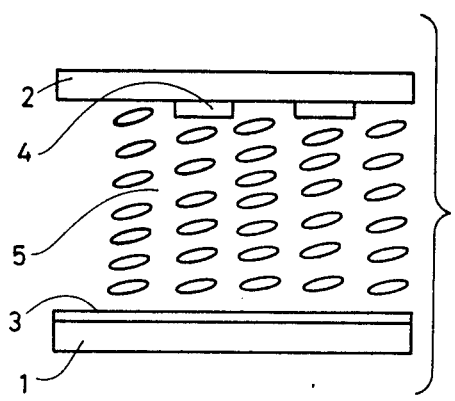
FIG. 2 is a state of LCD molecules arrayed in a conventional dot matrix display field effect mode LCD display element.
Figure 2B:
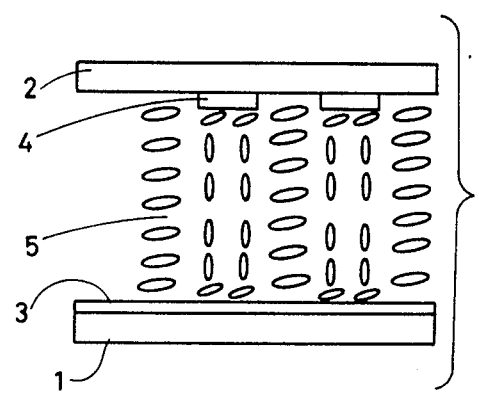
Figure 3A:
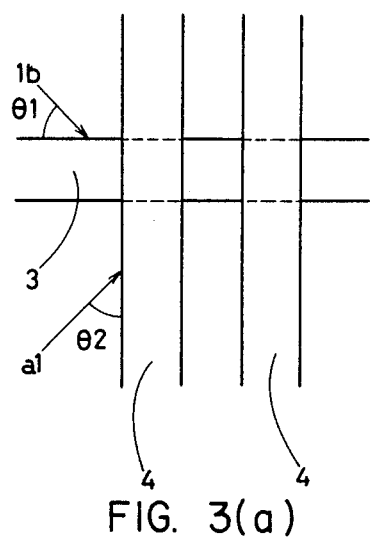
FIG. 3-(a) is the relationship between the electrode position and the direction of LCD molecules being oriented with respect to the substrate.
Figure 3B:
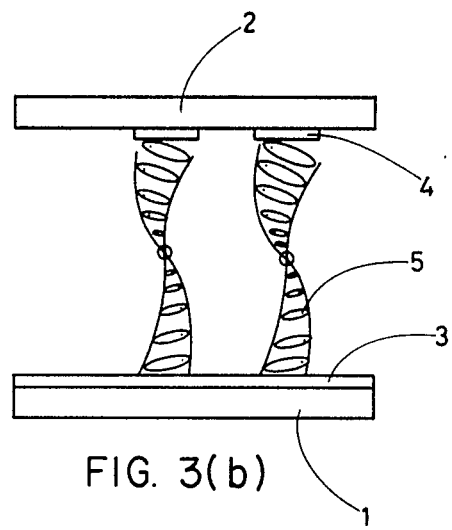
Figure 3C:
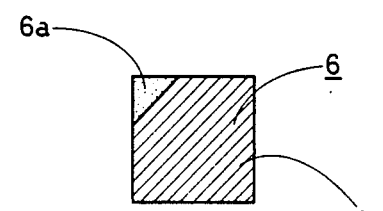
Figure 4A:
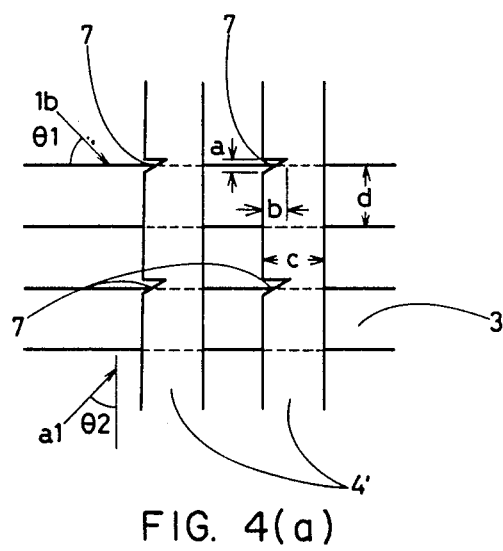
FIG. 4-(a) shows the electrode configuration of the field effect mode LCD display element in a preferred embodiment of the present invention.
Figure 4B:
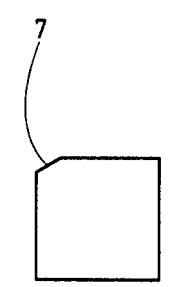
Figure 5A:
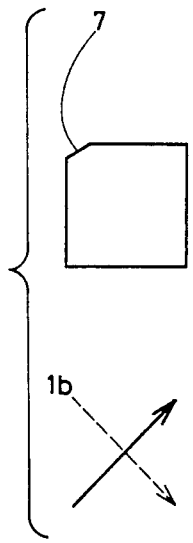
FIGS. 5(a)–5(d) and 6(a)–6(d) respectively shows the relationship between the cutout portion of the display pattern and the direction of the LCD molecules oriented with respect to the substrate.
Figure 5B:
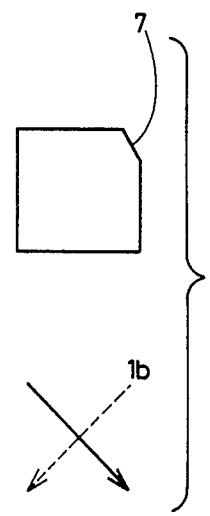
Figure 5C:
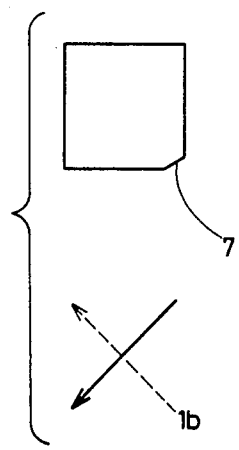
Figure 5D:
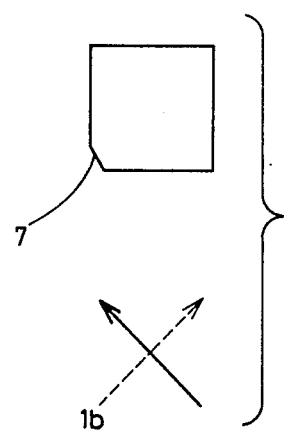
Figure 6A:
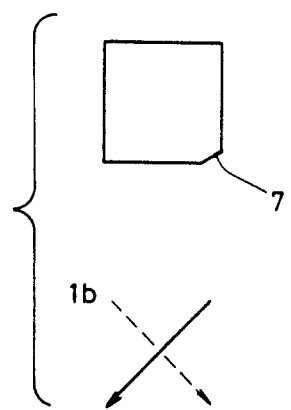
Figure 6B:
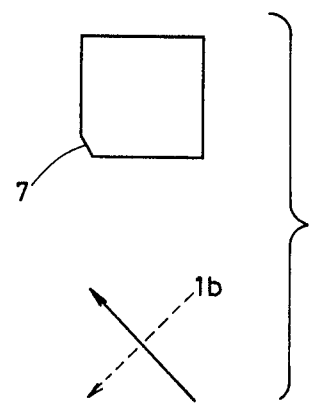
Figure 6C:
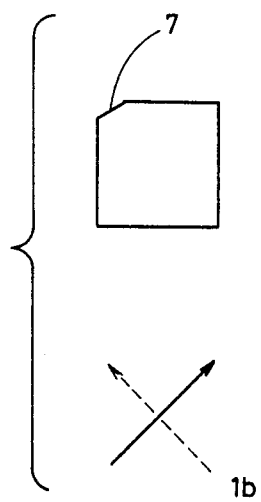
Figure 6D:
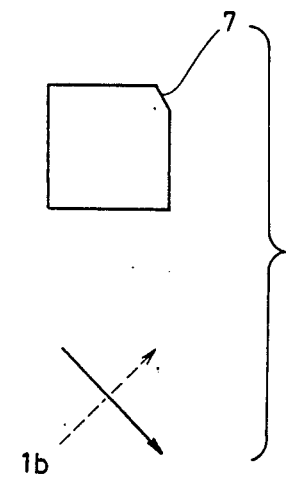

FIG. 4-(a) shows the electrode configuration of the field effect mode LCD display element as a preferred embodiment of the present invention. Reference 3 is a common electrode formed on the lower glass substrate and 4 is a segment electrode on the upper glass substrate. As with FIG. 3-(a), the orientation vector (a) of LCD molecules against the upper glass substrate and the other orientation vector (b) against the lower glass substrate is respectively denoted by $\theta 1 = 45°$ and $\theta 2 = 45°$. As a result, the normal visual angle area is in the direction of "6 o'clock". By effect of the forms of said common electrode 3 and segment electrode 4', a cross pattern, in other words, a dot pattern shown in FIG. 4-(b), is achieved. Now, since a cutout portion 7 is provided in part of said segment electrode 4', the influence of the electric force lines is reduced at the edge portion of the dot pattern, and as a result, the inverse orientation of the field effect-applied LCD molecules can be prevented. Although it is by no means desirable to form a large cutout portion 7 in part of said dot matrix pattern, by strictly defining the size said cutout portion 7 within an extremely narrow area, display quality is actually unaffected. In our experiments in reference to FIG. 4-(a), dimension "a" was designed at 30 microns, "b" at 120 microns, "c" at 300 microns, and "d" at 350 microns, respectively. When practicing the present invention, the display quality proved to be quite satisfactory. Although it was desirable to minimize those dimensions furthermore, it was eventually determined that those dimensions shown above were sufficient to effectively prevent LCD molecules from inversely oriented. To achieve this, said cutout portion 7 may be provided in such a position at which the LCD molecules invert their orientation, i.e., corresponding to the edge of such a portion where the common electrode 3 and segment electrode 4' cross each other. Consequently, if the direction of the normal visual angle area varies, i.e., if the direction of the orientation vector varies against the substrate, the position of said cutout portion 7 also varies.

FIG. 5 shows the relationship between the position of said cutout portion 7 and the directions of the orientation vectors (a) and (b) against substrates when LCD molecules are oriented to the left. FIG. 5-(a) denotes that the normal visual angle area is in the direction of "6 o'clock"; FIG. 5-(b) denotes that the normal visual angle area is in the direction of "9 o'clock"; FIG. 5-(c) denotes that the normal visual angle area is in the direction of "12 o'clock"; and FIG. 5-(d) denotes that the normal visual angle area is in the direction of "3 o'clock", respectively. FIGS. 6(a)-6(d) shows the relationship between the position of said cutout portion 7 and the directions of said orientation vectors (a) and (b) against substrates when LCD molecules are oriented to the right. FIG. 6-(a) denotes that the normal visual angle area is in the direction of "6 o'clock"; FIG. 6-(b) denotes that the normal visual angle area is in the direction of "9 o'clock"; FIG. 6-(c) denotes that the normal visual angle area is in the direction of "12 o'clock"; and FIG. 6-(d) denotes that the normal visual angle area is in the direction of "3 o'clock", respectively. In the drawings showing the preferred embodiment of the present invention, the form of said cutout portion 7 is designated by a triangle, however, the form of said cutout portion 7 is not only defined to such a triangle, but it may also be replaced by any shape, for example, the base may be round.

What is claimed is:

1. A field effect mode liquid crystal display element comprising;

liquid crystal display molecules sealed between upper and lower electrodes formed on the surfaces of upper and lower substrates, said upper and lower electrodes respectively have configurations different from each other so that any desired pattern can be displayed at a position where both electrodes cross; and a cutout portion, provided either in the upper or lower electrode, which prevents liquid crystal display molecules from being inversely oriented as would otherwise occur at a position where both electrodes cross, the size of said cutout portion being as small as possible.

2. A field effect mode liquid crystal display according to claim 1 wherein said desired pattern comprises a dot matrix pattern.

3. A matrix liquid crystal display panel comprising:
   first and second substrates;
   a liquid crystal material disposed between said substrates;
   a plurality of first electrodes formed on said first substrate adjacent said liquid crystal material, said first electrodes extending across said display panel in a first direction;
   a plurality of second electrodes formed on said second substrate adjacent said liquid crystal material, said second electrodes extending across said display panel in a second direction orthagonal to said first direction;
   each said first electrode intersecting a said second electrode at an intersection to form a substantially rectangular display element described by the overlap of said first and second electrodes; and
   means for inhibiting inverse orientation in said liquid crystal material disposed between said first and second electrodes within said display element, said means for inhibiting including,
      a cutout portion formed in a cutout supporting electrode of said first and second electrodes, said cutout portion truncating a corner of said substantially rectangular display element to prevent said inverse orientation in said liquid crystal material.

4. The display panel of claim 3 wherein said cutout portion is formed as a V-shaped notch.

5. The display panel of claim 4 wherein said first electrodes are substantially uniform in width and substantially parallel to each other.

6. The display panel of claim 5 wherein said second electrodes are substantially uniform in width and substantially parallel to each other.

7. The display panel of claim 6 wherein said notch has a first edge extending substantially perpendicular to the direction said cutout supporting electrode extends and a second edge extending diagonally from said first edge.

8. The display panel of claim 7 wherein said display elements are sized approximately 300 by 350 microns.

9. The display panel of claim 8 wherein said first edge of said notch is approximately 30 microns.

10. The display panel of claim 4 wherein said first and second substrates are formed so as to orient said liquid crystal material at said substrates in third and fourth orthagonally disposed directions, respectively.

11. The display panel of claim 10 wherein said third and fourth orthogonally disposed directions are diagonal with respect to said first and second diagonally disposed directions.

12. The display panel of claim 11 wherein said second edge of said notch extends in a direction perpendicular to the direction of orientation of said liquid crystal material adjacent the said substrate upon which said cutout supporting electrode is formed.

13. The display panel of claim 3 wherein said inverse orientation is created by the edge domain phenomenon.

14. The display panel of claim 3 wherein said cutout portion is sized so as to prevent said inverse orientation without substantially altering the appearance of said display element.

15. A method of manufacturing a matrix liquid crystal display panel comprising:

forming a matrix liquid crystal panel comprising first and second substrates, a liquid crystal material disposed between said substrates, a plurality of first electrodes formed on said first substrate adjacent said liquid crystal material, said first electrodes extending across said diplay panel in a first direction, a plurality of second electrodes formed on said second substrate adjacent said liquid crystal material, said second electrodes extending across said display panel in a second direction orthogonal to said first direction, each said first electrode intersecting a said second electrode at an intersection to form a substantially rectangular display element described by the overlap of said first and second electrodes; and means for inhibiting inverse orientation in said liquid crystal material disposed between said first and second electrodes within said display element, by forming a cutout portion in one of said first and second electrodes by truncating a corner of said substantially rectangular display element to prevent said inverse orientation.

* * * * *